US010019008B2

(12) United States Patent
Kong et al.

(10) Patent No.: US 10,019,008 B2
(45) Date of Patent: Jul. 10, 2018

(54) SIDESLIP COMPENSATED CONTROL METHOD FOR AUTONOMOUS VEHICLES

(71) Applicant: Baidu USA LLC, Sunnyvale, CA (US)

(72) Inventors: Qi Kong, Sunnyvale, CA (US); Fan Zhu, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 15/279,141

(22) Filed: Sep. 28, 2016

(65) Prior Publication Data

US 2018/0088582 A1 Mar. 29, 2018

(51) Int. Cl.
*G05D 1/02* (2006.01)
*B60W 40/103* (2012.01)
(Continued)

(52) U.S. Cl.
CPC ......... *G05D 1/0212* (2013.01); *B60W 40/103* (2013.01); *B62D 6/002* (2013.01);
(Continued)

(58) Field of Classification Search
CPC ............. B60W 40/101; B60W 40/103; B60W 2520/20; B60W 2720/20;
(Continued)

(56) References Cited

U.S. PATENT DOCUMENTS 5,243,524 A * 9/1993 Ishida ................. G05D 1/0212
180/169
5,579,245 A * 11/1996 Kato ....................... B62D 6/00
701/41
(Continued)

OTHER PUBLICATIONS

Carlson, G.A., "Experimental errors and uncertainty", © G.A. Carlson, 2000-2002, 6 pages, downloaded from: http://www.ece.rochester.edu/courses/ECE111/error_uncertainty.pdf (Year: 2002).*
(Continued)

*Primary Examiner* — Behrang Badii
*Assistant Examiner* — David A Testardi
(74) *Attorney, Agent, or Firm* — Womble Bond Dickinson (US) LLP

(57) ABSTRACT

A set of driving scenarios are determined for different types of vehicles. Each driving scenario corresponds to a specific movement of a particular type of autonomous vehicles. For each of the driving scenarios of each type of autonomous vehicles, a set of driving statistics is obtained, including driving parameters used to control and drive the vehicle, a driving condition at the point in time, and a sideslip caused by the driving parameters and the driving condition under the driving scenario. A driving scenario/sideslip mapping table or database is constructed. The scenario/sideslip mapping table includes a number of mapping entries. Each mapping entry maps a particular driving scenario to a sideslip that is calculated based on the driving statistics. The scenario/sideslip mapping table is utilized subsequently to predict the sideslip under the similar driving environment,
(Continued)

such that the driving planning and control can be compensated.

21 Claims, 13 Drawing Sheets

(51) Int. Cl.
*G05D 1/00* (2006.01)
*B62D 6/00* (2006.01)
*G01C 21/34* (2006.01)
*G01C 21/36* (2006.01)

(52) U.S. Cl.
CPC ..... *G01C 21/3415* (2013.01); *G01C 21/3691* (2013.01); *G05D 1/0022* (2013.01); *G05D 1/0088* (2013.01); *G05D 1/021* (2013.01); *G05D 1/0214* (2013.01)

(58) Field of Classification Search
CPC ........ B60W 2050/0028; B60T 8/17552; B60T 2230/02; G01C 21/16; G01C 21/165; G01C 21/26; G01C 21/28; G01C 25/00; G05D 1/0212; G05D 1/0214; G05D 1/0221; G05D 1/021; B62D 6/002
See application file for complete search history.

(56) References Cited

U.S. PATENT DOCUMENTS

| | | | | |
|---|---|---|---|---|
| 6,308,115 B1* | 10/2001 | Yamaguchi | ............. | B60T 8/172 180/197 |
| 7,440,824 B2* | 10/2008 | Chen | ............. | B60T 8/172 701/1 |
| 7,599,774 B2* | 10/2009 | Shin | ............. | B62D 6/007 180/13 |
| 7,689,392 B2* | 3/2010 | Boyd | ............. | G09B 9/048 703/8 |
| 7,689,393 B2* | 3/2010 | Boyd | ............. | B60T 8/885 703/8 |
| 8,234,090 B2* | 7/2012 | Nardi | ............. | B60T 8/172 702/142 |
| 9,165,477 B2* | 10/2015 | Wilson | ............. | G08G 1/0112 |
| 2002/0198655 A1 | 12/2002 | Bevly et al. | | |
| 2003/0040849 A1* | 2/2003 | Hathout | ............. | B60K 28/165 701/1 |
| 2003/0045980 A1* | 3/2003 | Boswell | ............. | B60G 17/0195 701/41 |
| 2006/0020382 A1 | 1/2006 | Shin et al. | | |
| 2007/0145819 A1* | 6/2007 | Lin | ............. | B60T 8/172 303/146 |
| 2007/0213902 A1* | 9/2007 | Shin | ............. | B62D 6/007 701/42 |
| 2007/0244606 A1* | 10/2007 | Zhang | ............. | B60T 8/17551 701/1 |
| 2009/0276111 A1* | 11/2009 | Wang | ............. | B60T 8/17551 701/23 |
| 2010/0106356 A1 | 4/2010 | Trepagnier et al. | | |
| 2010/0131229 A1* | 5/2010 | Nardi | ............. | B60T 8/172 702/142 |
| 2010/0209889 A1* | 8/2010 | Huang | ............. | B60W 40/09 434/65 |
| 2011/0218700 A1* | 9/2011 | Mori | ............. | B60W 10/06 701/31.4 |
| 2013/0000092 A1* | 1/2013 | Hukkeri | ............. | G05D 1/021 29/402.01 |
| 2013/0238181 A1* | 9/2013 | James | ............. | B60W 50/0097 701/23 |
| 2015/0266455 A1* | 9/2015 | Wilson | ............. | G09B 19/10 701/93 |
| 2016/0031450 A1 | 2/2016 | Wilson | | |
| 2016/0046287 A1 | 2/2016 | Owen et al. | | |
| 2017/0225688 A1* | 8/2017 | Milanese | ............. | B60W 40/103 |
| 2017/0270236 A1* | 9/2017 | Yamaura | ............. | G06F 17/5095 |
| 2017/0291638 A1* | 10/2017 | Gupta | ............. | B60W 40/103 |

OTHER PUBLICATIONS

Nishio, Akitaka et al., "Development of a vehicle stability control system based on vehicle sideslip angle estimation", SAE Technical Paper Series, 2001-01-0137, SAE 2001 World Congress, Mar. 5-8, 2001, 10 pages. (Year: 2001).*

Hac, Aleksander et al., "Estimation of vehicle side slip angle and yaw rate", SAE Technical Paper Series, 2000-01-0696, SAE 2000 World Congress, Mar. 6-9, 2000, 9 pages (Year: 2000).*

* cited by examiner

| Driving Scenarios | Sideslip/Turning Radius |
|---|---|
| U-turn, 200 steering degrees, 20 mph, dry road | |
| U-turn, 200 steering degrees, 30 mph, wet road | |
| Left turn, 150 steering degrees, 20mph, wet road | |
| Right turn, 100 steering degrees, 25 mph, dry road | |
| ... | |

FIG. 9

SIDESLIP COMPENSATED CONTROL METHOD FOR AUTONOMOUS VEHICLES

TECHNICAL FIELD

Embodiments of the present invention relate generally to operating autonomous vehicles. More particularly, embodiments of the invention relate to correcting sideslip for controlling autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, autonomous driving vehicles could have a very complicated movement behavior than one would expect. Different vehicles running on different roads with different speeds and steering angles may have a different turning radius. Such different turning radius may have an impact on the control accuracy especially when the vehicle is making turns. In many situations, especially making a turn such as a U-turn, left turn, or right turn, a vehicle would skid sideways dependent upon the conditions of the roads. Such sideslip or skid can cause a control error, and it sometimes is unsafe to the passengers riding in the vehicle.

In addition, it is important to determine or predict a vehicle's status or state in a next processing cycle based on its current status and executed commands. However, there is no sophisticated method available for such a determination or prediction.

BRIEF DESCRIPTION OF THE DRAWINGS

Embodiments of the invention are illustrated by way of example and not limitation in the figures of the accompanying drawings in which like references indicate similar elements.

FIG. 9 is a block diagram illustrating an example of a driving scenario to sideslip mapping data structure according to one embodiment of the invention.

DETAILED DESCRIPTION

Figure 1:
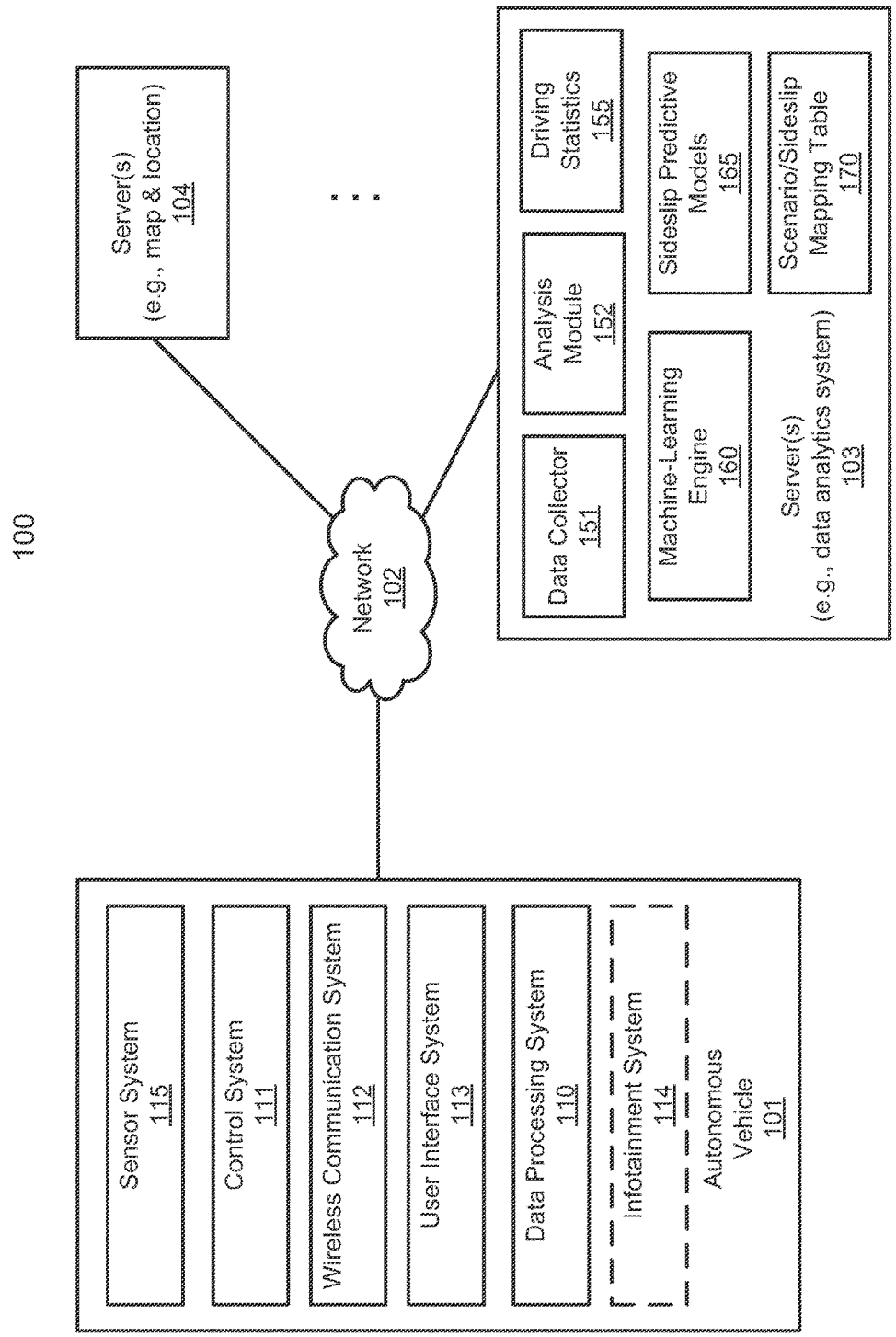
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, when determining a next move for a next route or path segment of a next move cycle (e.g., a turn), based on the planned route information, a physical model (e.g., a predetermined formula or a set of rules) is utilized to calculate or determine the vehicle's next status or state. Planning and control data is generated based on the physical model, where the planning and control data include sufficient data and commands to control how the vehicle will move in the next move cycle. In addition, a sideslip predictive model is applied to at least a set of driving parameters associated with the planning and control data, as well as the driving conditions at the point in time (e.g., road condition, weather). The sideslip or skid under the driving scenario described by the planning and control data is predicted using the sideslip predictive model. The planning and control data may then be modified based on the predicted sideslip to compensate such a sideslip. The vehicle is then controlled and driven based on the modified or compensated planning and control data.

In one embodiment, a driving scenario is identified for a next movement for an autonomous vehicle, where the driving scenario is represented by a set of one or more predetermined parameters. A first next movement is calculated for the autonomous vehicle using a physical model corresponding to the driving scenario. A sideslip predictive model is applied to the set of predetermined parameters to predict a sideslip of the autonomous vehicle under the driving scenario. A second next movement of the autonomous vehicle is determined based on the first next movement and the predicted sideslip of the autonomous vehicle. The predicted sideslip is utilized to modify the first next movement to compensate the sideslip. Planning and control data is generated for the second next movement and the autonomous vehicle is controlled and driven based on the planning and control data.

According to another aspect of the invention, driving statistics of a variety of vehicles under a variety of driving environments or conditions are recorded and captured by the vehicles. In addition, the sideslips of the vehicles under different driving environments or driving scenarios are measured and determined. The driving statistics are then collected by a central facility such as a data analytics system or server. The driving statistics and the measured sideslips are then analyzed to develop a list of driving scenarios. Each driving scenario is associated with a particular sideslip or skid that likely incurs under the same or similar driving scenario. A driving scenario to sideslip (scenario/sideslip) mapping table or database is created. The scenario/sideslip mapping table maps each of the driving scenario to a sideslip that is determined based on the driving statistics and measured sideslips of a variety of vehicles of the same type or similar types.

When determining a next movement of a particular vehicle online, a driving scenario for the next movement is determined at the point in time. A lookup operation is performed in the scenario/sideslip mapping table based on the determined driving scenario to obtain the predetermined sideslip corresponding to the driving scenario at the point in time. The predetermined sideslip will be taken into consideration in generating planning and control data for the next movement. The vehicle is then controlled and driven based on the planning and control data that has been compensated for the predicted sideslip under the same or similar driving environment or condition.

In one embodiment, a set of driving scenarios are determined for different types of vehicles. Each driving scenario corresponds to a specific movement of a particular type of autonomous vehicles. For each of the driving scenarios of each type of autonomous vehicles, a set of driving statistics is obtained. The driving statistics include one or more driving parameters (e.g., speed, turning angle) used to control and drive the vehicle, a driving condition (e.g., road condition, weather) at the point in time, and a sideslip caused by the driving parameters and the driving condition under the driving scenario. A driving scenario/sideslip mapping table or database is constructed. The scenario/sideslip mapping table includes a number of mapping entries. Each mapping entry maps a particular driving scenario to a sideslip that is calculated based on the driving statistics. The scenario/sideslip mapping table is utilized subsequently to predict the sideslip under the similar driving environment, such that the driving planning and control can be compensated.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (POI) severs, or location servers, etc.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, data processing system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or data processing system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
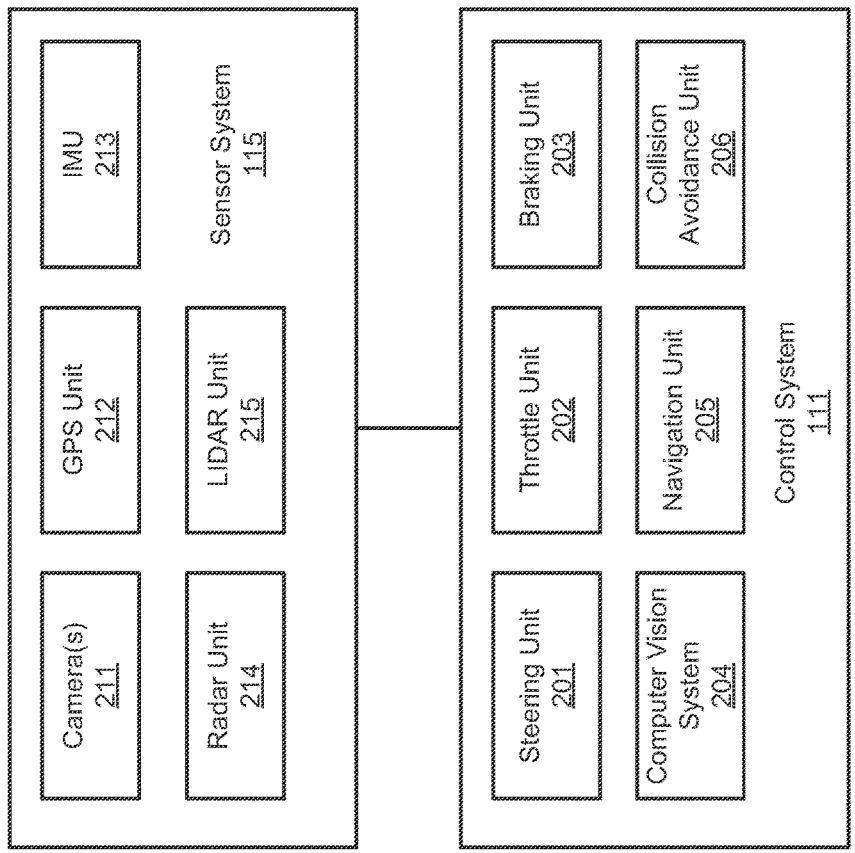
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), braking unit 203, computer vision system 204, navigation unit 205 (also referred to as a navigation and pathing or navigation/pathing system), and collision avoidance unit 206 (also referred to as an obstacle avoidance system). Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Computer vision unit or system 204 is to process and analyze images captured by one or more cameras 211 in order to identify objects and/or features in the environment of autonomous vehicle. The objects can include traffic signals, road way boundaries, other vehicles, pedestrians, and/or obstacles, etc. Computer vision system 204 may use an object recognition algorithm, video tracking, and other computer vision techniques. In some embodiments, computer vision system 204 can map an environment, track objects, and estimate the speed of objects, etc.

Navigation unit or system 205 is to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. Navigation system 205 may update the driving path dynamically while the autonomous vehicle is in operation. Navigation system 205 can incorporate data from a GPS system and one or more maps so as to determine the driving path for the autonomous vehicle.

Collision avoidance unit or system 206 is to identify, evaluate, and avoid or otherwise negotiate potential obstacles in the environment of the autonomous vehicle. For example, collision avoidance system 206 may effect changes in the navigation of the autonomous vehicle by operating one or more subsystems in the control system to undertake swerving maneuvers, turning maneuvers, braking maneuvers, etc. Collision avoidance system 206 may automatically determine feasible obstacle avoidance maneuvers on the basis of surrounding traffic patterns, road conditions, etc. Collision avoidance system 206 may be configured such that a swerving maneuver is not undertaken when other sensor systems detect vehicles, construction barriers, etc. in the region adjacent the autonomous vehicle that would be swerved into. Collision avoidance system 206 may automatically select the maneuver that is both available and maximizes safety of occupants of the autonomous vehicle. Collision avoidance system 206 may select an avoidance maneuver predicted to cause the least amount of acceleration in a passenger cabin of the autonomous vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some of all of the functions of autonomous vehicle 101 may be controlled or managed by data processing system 110, especially when operating in an autonomous driving mode. Data processing system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, data processing system 110 may be integrated with vehicle control system 111.

For example, a user as a passenger may specify a starting location and a destination of a trip, for example, via a user interface. Data processing system 110 communicates with other components of autonomous vehicle 101 to obtain the trip related data. For example, data processing system 110 may obtain location and route information from a location server and a map and POI (MPOI) server, which may be a part of servers 103-104. The location server provides location services and the MPOI server provides map services and the POIs of certain locations. Alternatively, such location and MPOI information may be cached locally in a persistent storage device of data processing system 110.

During traveling of autonomous vehicle 101 along the route, data processing system 110 may also obtain real-time traffic information from a traffic information system or server (TIS). Note that servers 103-104 may be operated by a third party entity. Alternatively, the functionalities of servers 103-104 may be integrated with data processing system 110. Based on the real-time traffic information, MPOI information, and location information, as well as real-time local environment data detected or sensed by sensor system 115 (e.g., obstacles, objects, nearby vehicles), data processing system 110 can plan an optimal route and drive vehicle 101, for example, via control system 111, according to the planned route to reach the specified destination safely and efficiently.

According to one embodiment, autonomous vehicle 101 may further include infotainment system 114 to provide information and entertainment to passengers of vehicle 101. The information and entertainment content may be received, compiled, and rendered based on content information stored locally and/or remotely (e.g., provided by servers 103-104). For example, the information may be streamed in real-time from any of servers 103-104 over network 102 and displayed on a display device of vehicle 101. The information may be augmented with local information captured in real-time, for example, by one or more cameras and the augmented content can then be displayed in a virtual reality manner.

In one embodiment, based on location and route information, MPOI information, and/or real-time traffic information, infotainment system 114 and/or data processing system 110 determines certain types of content that are suitable for the current traffic environment (e.g., MPOIs). The system performs a lookup operation in a content index (not shown) to identify a list content items (e.g., sponsored content or Ads) as content item candidates, for example, based on the real-time traveling information. The selected content item is then rendered and displayed on a display device within the autonomous vehicle. Note that infotainment system 114 may be integrated with data processing system 110 according to some embodiments.

In one embodiment, when determining a next move for a next route or path segment of a next move cycle (e.g., a turn), based on the planned route information, a physical model (e.g., a predetermined formula or set of rules) is utilized by data processing system 110 to calculate or determine the vehicle's next status or state. A physical model refers to a set of rules or algorithms that have been configured to plan and control a movement of an autonomous vehicle based on a perception of the surrounding environment of the vehicle. Planning and control data is generated based on the physical model, where the planning and control data include sufficient data and commands to control how the vehicle will move in the next move cycle. In addition, a sideslip predictive model is applied to at least a set of driving parameters associated with the planning and control data, as well as the driving conditions at the point in time (e.g., road condition, weather condition). The sideslip or skid under the driving scenario described by the planning and control data is predicted using the predictive model. The planning and control data may then be modified based on the predicted sideslip to compensate such a sideslip. The vehicle is then controlled and driven based on the modified or compensated planning and control data.

The sideslip predictive model may be stored in data processing system 110, which may be provided by a data analytics system, in this example, server 103 as a part of sideslip predictive models 165. In one embodiment, data analytics system 103 includes, but is not limited to, data collector or collection module 151, analysis module 152, and machine-learning engine 160. Data collector 151 collects driving statistics 155 from a variety of vehicles that have been driven through a variety of driving environments or driving conditions.

Figure 4B:
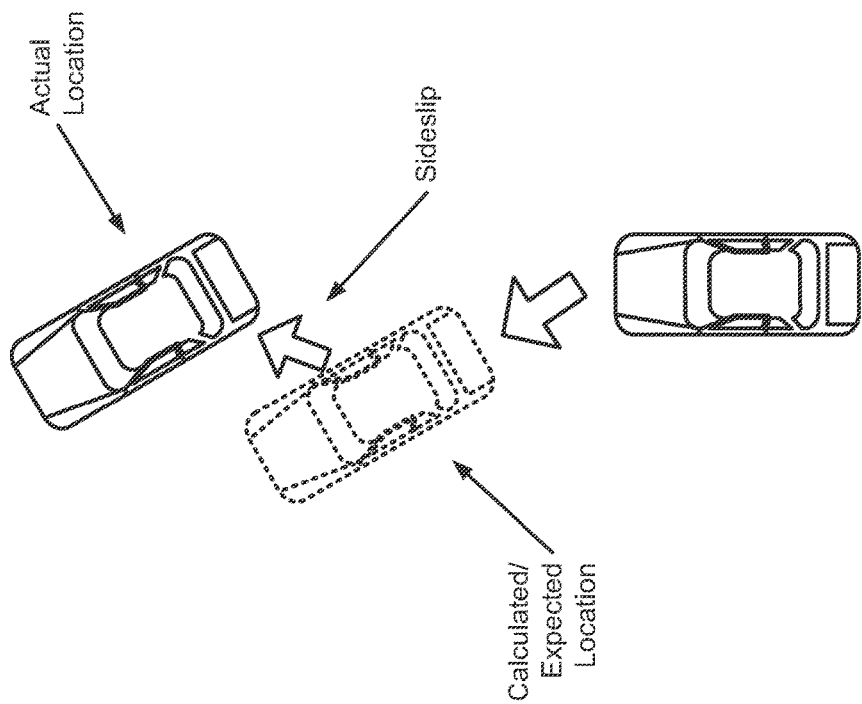
FIGS. 4A and 4B are diagrams illustrating a vehicle driving pattern with or without sideslip compensation.
Figure 4A:
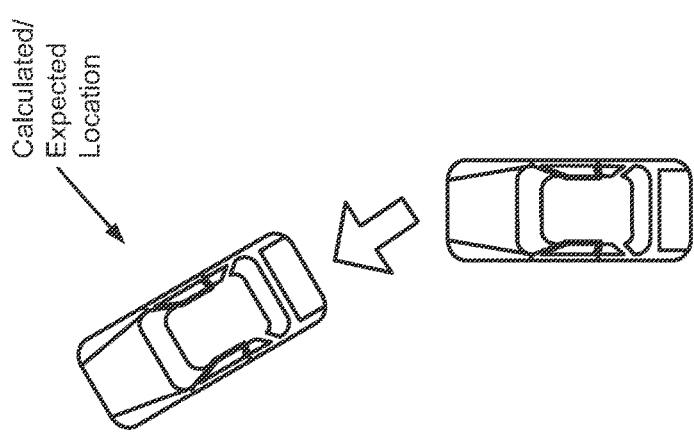

Driving statistics of a vehicle may be recorded and captured by one or more sensors of the vehicle. The driving statistics may include certain driving parameters or commands applied to the vehicle at different points in times representing different driving scenarios. For example, when driving through a particular driving environment, certain driving parameters, such as, the speed, turning angle, acceleration (e.g., throttle parameters such as a pressure applied to a gas pedal), deceleration (e.g., braking parameters such as a pressure applied to a brake pedal), may be recorded. In addition, sideslips of the vehicle under the circumstances may also be measured and recorded to be associated with the corresponding set of driving parameters. A sideslip refers to a difference in distance or paths between a first location or position of a vehicle that was expected to end up as shown in FIG. 4A and a second location or position of the vehicle actually ended up due to the driving condition as shown in FIG. 4B. The driving condition can be determined based on one or more of road condition, weather, particular weight or dimension of the vehicle, speed, turning angle, acceleration, or deceleration. The expected position of the vehicle may be determined using a predetermined formula (referred to as a physical model) given the driving parameters as planned. That is, the expected location of a vehicle is determined based on a physical model associated with the vehicle, without considering the road condition or weather condition.

According to one embodiment, the captured driving parameters and the sideslips of various vehicles under various driving scenarios may be analyzed by machine-learning engine 160 using machine-learning techniques to generate one or more sideslip predictive models 165. Machine learning explores the study and construction of algorithms that can learn from and make predictions on data. Such algorithms operate by building a model from example inputs in order make data-driven predictions or decisions, rather than following strictly static program instructions.

Figure 5:
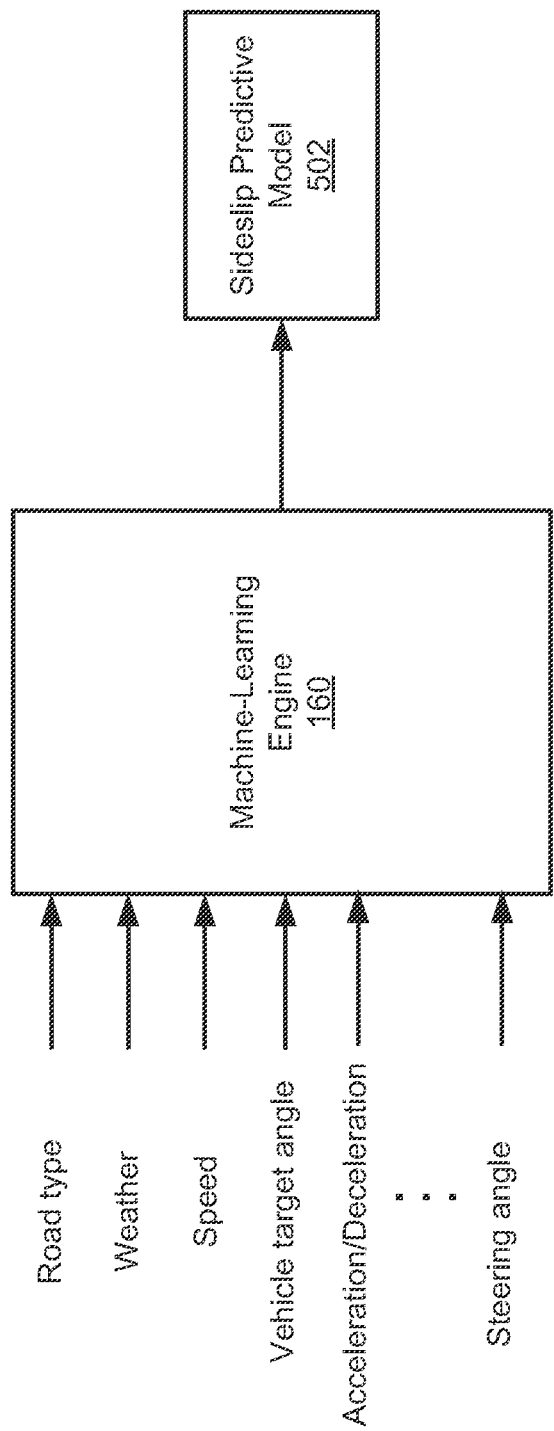
FIG. 5 is a block diagram illustrating a mechanism to generate a sideslip predictive model according to one embodiment of the invention.

In predicting sideslips of vehicles, referring now to FIG. 5, the inputs to machine-learning engine 160 are driving parameters 501 of a large amount of driving statistics and their corresponding measured sideslips. Machine-learning engine 160 "learns" the driving patterns that produce sideslips based on driving statistics 155 and generates sideslip predictive model 502, which may be a part of predictive models 165, as a result of the machine learning. Each of predictive models 165 may be associated with a particular type or category of vehicles, as each type of vehicles may have a different configuration or physical size, which may contribute to a different sideslip. Sideslip predictive models 165 can then be uploaded to the vehicles for online sideslip prediction.

According to another embodiment, referring back to FIG. 1, analysis module 152 performs an analysis on driving statistics 155 to identify a list of driving scenarios. A driving scenario refers to a specific driving pattern such as driving a specific distance with a specific speed (e.g., maintaining a constant speed, acceleration, or deceleration), turning with a specific turning angle at a certain speed, changing lanes at a certain speed and/or angle, etc. For each of the driving scenarios, analysis module 152 further determines a sideslip incurred during the corresponding to the driving scenario from driving statistics 155. The sideslip for a particular driving scenario may be determined based on a large number of sideslips committed by a large number of vehicles of the same type or similar types under the same or similar driving scenarios. For example, the sideslip may be determined by taking an average of sideslips of a number of similar vehicles measured under the similar driving environment.

Based on the analysis, scenario/sideslip mapping tables or databases 170 are created. Each scenario/sideslip mapping table includes a number of mapping entries. Each mapping entry maps a particular driving scenario to a sideslip. A sideslip may be represented by a turning radius. There may be one scenario/sideslip mapping table for each type or category of vehicles. Scenario/sideslip mapping tables 170 are then loaded onto the corresponding vehicles to be utilized during real-time driving.

Figure 3:
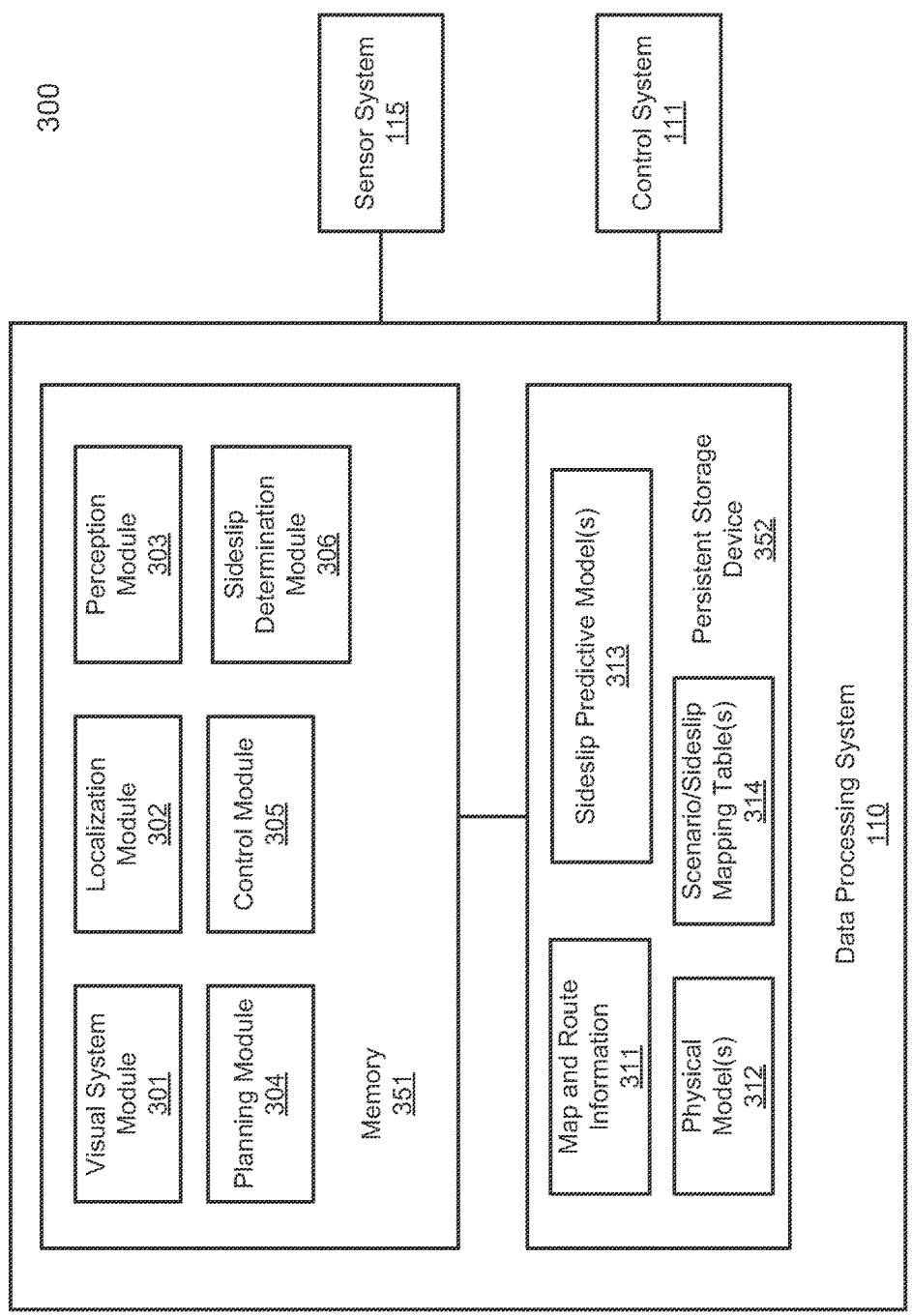
FIG. 3 is a block diagram illustrating an example of a data processing system used with an autonomous vehicle according to one embodiment of the invention.

FIG. 3 is a block diagram illustrating an example of a data processing system used with an autonomous vehicle according to one embodiment of the invention. System 300 may be implemented as a part of autonomous vehicle 101 of FIG. 1 including, but is not limited to, data processing system 110, control system 111, and sensor system 115. Referring to FIG. 3, data processing system 110 includes, but is not limited to, visual system module (VSM) 301, localization module 302, perception module 303, planning module 304, control module 305, and sideslip determination module 306.

Some or all of these modules may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. For example, VSM module 301 may be at least partially integrated with computer vision system 204. Perception module 303, planning module 304, and/or control module 305 may be at least partially integrated with navigation unit 205 and collision avoidance unit 206.

According to one embodiment, in response to sensor data (e.g., an image) captured by sensor system 115, VSM module 301 performs an analysis on the sensor data to derive metadata describing the environment surrounding the autonomous vehicle. For example, given an image captured by a camera onboard, VSM module 301 may perform an image recognition on the image to determine the content represented by the image. The content represented by an image may include people, a background such as building, a sign, traffic light signals, moving vehicles or objects, lane configuration, etc.

Localization module 302 (also referred to as a map and route module) manages any data related to a trip or route of a user. A user may log in and specify a starting location and a destination of a trip, for example, via a user interface. Localization module 302 communicates with other components of autonomous vehicle 300, such as map and route information 311, to obtain the trip related data. For example, localization module 302 may obtain location and route information from a location server and a map and POI (MPOI) server. A location server provides location services and an MPOI server provides map services and the POIs of certain locations, which may be cached as part of map and route information 311. During traveling of autonomous vehicle 300 along the route, localization module 302 may also obtain real-time traffic information from a traffic information system or server.

Based on the analysis provided by VSM 301 and localization information obtained by localization module 302, a perception of the surrounding environment is determined by perception module 303. The perception information may represent what an ordinary driver would perceive surrounding a driving vehicle in which the driver is driving. The perception can include the lane configuration (e.g., straight or curve lanes), traffic light signals, the relative positions of another vehicle, a pedestrian, a building, crosswalk, or other traffic related signs (e.g., stop signs, yield signs), etc. Each of these items is considered as an object.

Based on the perception information, planning module 304 is to plan a path or route for the autonomous vehicle, as well as driving parameters (e.g., distance, speed). Planning and control data is generated by planning module 304 including information describing how vehicle 300 would move in a next route or route segment (also referred to as a next move cycle). For example, the planning and control data may instruct the vehicle to move 100 meters at a speed of 30 mile per hour (mph), then change to a right lane at the speed of 25 mph.

Based on the planning and control data control module 305 is to control the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

According to one embodiment, when planning a next movement of the vehicle, planning module 304 invokes sideslip determination module 306 to determine or predict a sideslip for the driving scenario of the next movement. Planning module 304 may determine the next movement using a physical model or a predetermined formula 312 based on the perception provided by perception module 303. In response to the next movement, sideslip determination module 306 determines a sideslip associated with the next movement by applying a sideslip predictive model 313 to a set of driving parameters generated by physical model 312 as shown in FIG. 6.

Figure 6:
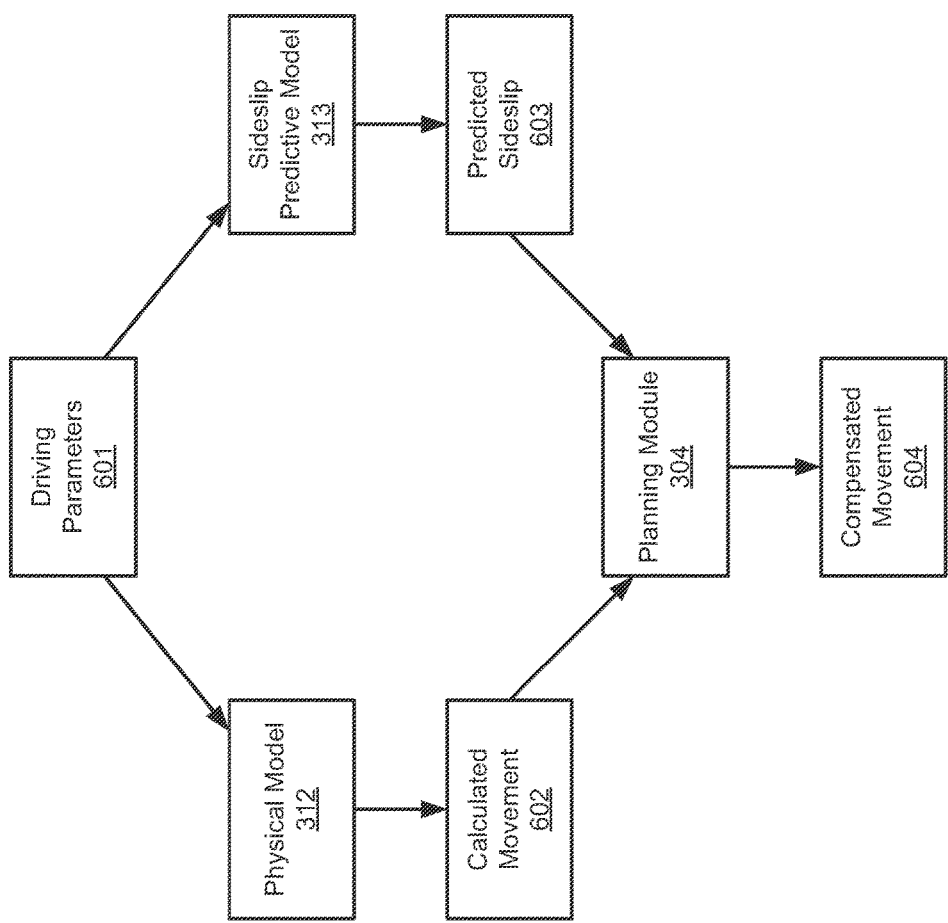
FIG. 6 is a processing flow illustrating a process for compensating sideslips of autonomous vehicles according to one embodiment of the invention.

Referring to FIG. 6, a set of driving parameters 601 for the next movement are fed into both physical model 312 and sideslip predictive model 313. The driving parameters can include one or more of a road type or condition, weather (e.g., temperature, moisture), vehicle speed, vehicle target angle, vehicle acceleration/deceleration, steering angle, steering target angle, steering speed, and steering direction. With driving parameters 601, physical model 312 can determine next movement 602 (e.g., expected movement without sideslip compensation). For example, with the angle of front wheels, the distance between the front and rear wheels, the physical model 312 can calculate the curvature of the current moving path. With the speed of a vehicle and the length of the path, the position shift of the vehicle can be determined.

In addition, sideslip predictive model 313 is applied to the set of driving parameters 601, which infers or predicts sideslip 603 under the driving scenario represented by driving parameters 601. Based on the calculated movement 602, planning module 304 can compensate the sideslip based on predicted sideslip 603 by modifying calculated movement 602 to generate compensated movement 604. In one embodiment, the modified or compensated position of the vehicle can be determined based on (e.g., by adding) the original calculated position based on the physical model, a movement of the wheels, and the predicted sideslip. Planning and control data for the next movement can be generated based on compensated movement 604, and the vehicle can be controlled and driven based on the planning and control data.

Figure 7:
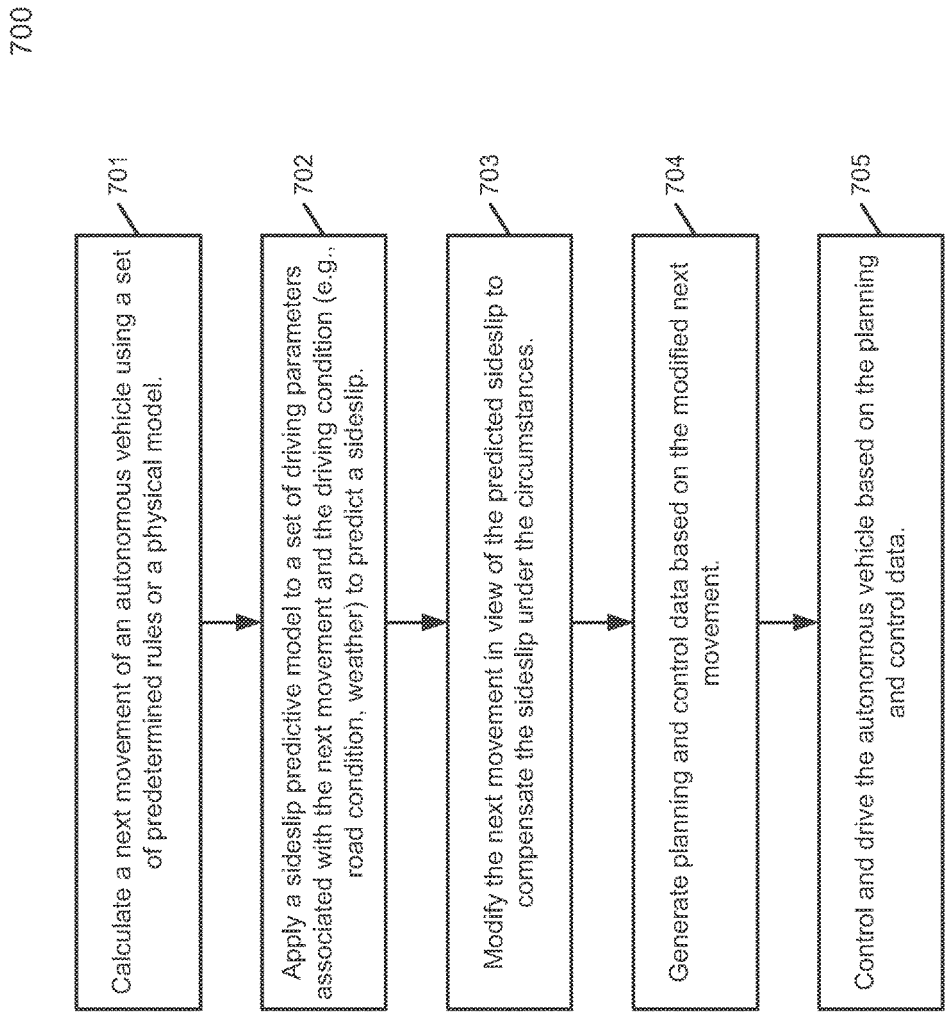
FIG. 7 is a flow diagram illustrating a process of operating an autonomous vehicle according to one embodiment of the invention.

FIG. 7 is a flow diagram illustrating a process of operating an autonomous vehicle according to one embodiment of the invention. Process 700 may be performed by processing logic which may include software, hardware, or a combination thereof. For example, process 700 may be performed by data processing system 110. Referring to FIG. 7, during online driving at block 701, processing logic calculates a next movement (e.g., next state or next status) of an autonomous vehicle based on a set of driving parameters using a physical model (or a predetermined algorithm or a set of rules). At block 702, processing logic applies a sideslip predictive model to the set of driving parameters representing a particular driving scenario to predict a sideslip. At block 703, processing logic compensates the next movement of the vehicle in view of the predicted sideslip by modifying the driving parameters. At block 704, processing logic generate planning and control data based on the compensated next movement. At block 705, the autonomous vehicle is controlled and driven based on the planning and control data.

Figure 8:
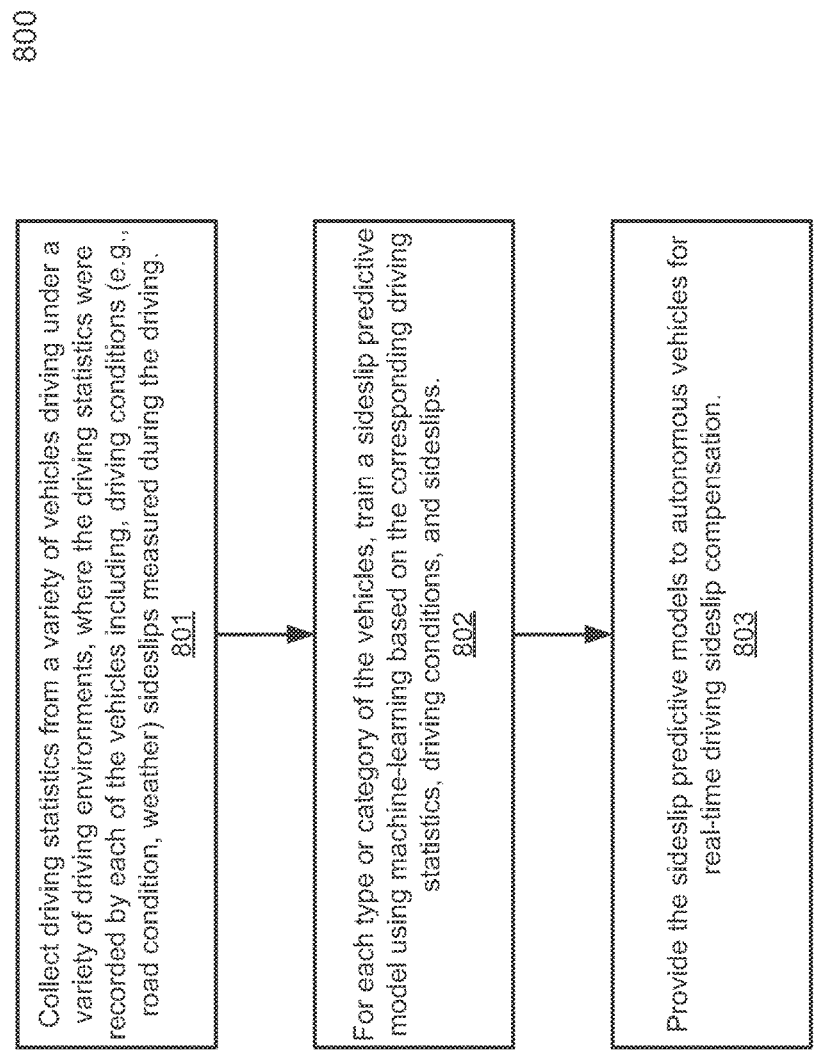
FIG. 8 is a flow diagram illustrating a process of generating a sideslip predictive model according to one embodiment of the invention.

FIG. 8 is a flow diagram illustrating a process of generating sideslip predictive models using machine learning according to one embodiment of the invention. Process 800 may be performed by processing logic which may include software, hardware, or a combination thereof. Process 800 may be performed by a data analytics system such as server 103 of FIG. 1. Referring to FIG. 8, at block 801, processing logic collects driving statistics of a variety of vehicles under a variety of driving scenarios, including driving parameters or commands applied and sideslips measured by the vehicles under the circumstances as described above. At block 802, for each type or category of the vehicles, processing logic trains a sideslip predictive model based on the corresponding driving statistics using machine learning techniques. At block 803, the sideslip predictive models are provided (e.g., transmitted, uploaded) to the autonomous vehicles for subsequent onboard sideslip compensation in real-time.

Referring back to FIG. 3, according one embodiment, in response to a request for determining a sideslip, sideslip determination module 306 determines a driving scenario at the point in time. The driving scenario may be determined based on the driving parameters of a planned next move provided by planning module 304 and the driving condition at the point in time (e.g., road and weather conditions). For example, a driving scenario can be one or more of taking a U-turn with 200 steering degrees and 30 mph on a dry road, taking a left turn with 150 steering degrees and 20 mph on a wet road, or taking a right turn with 100 steering degrees and 25 mph on a dry road, etc.

Based on the determined driving scenario, sideslip determination module 306 looks up in scenario/sideslip mapping table 314 to locate a mapping entry that matches the driving scenario at the point in time. An example of scenario/sideslip mapping table 314 is shown in FIG. 9 according to one embodiment. The sideslip is obtained from the matching entry. The sideslip is then utilized by planning module 304 to modify the calculated driving parameters in order to compensate the sideslip. In one embodiment, a steering angle is determined based on a speed required by a route or route segment associated with the next movement using a set of rules or a physical model. The steering angle is then modified in view of the predicted sideslip obtained from the scenario/sideslip mapping table. The modified steering angle is utilized to plan and control the autonomous vehicle.

Figure 10B:
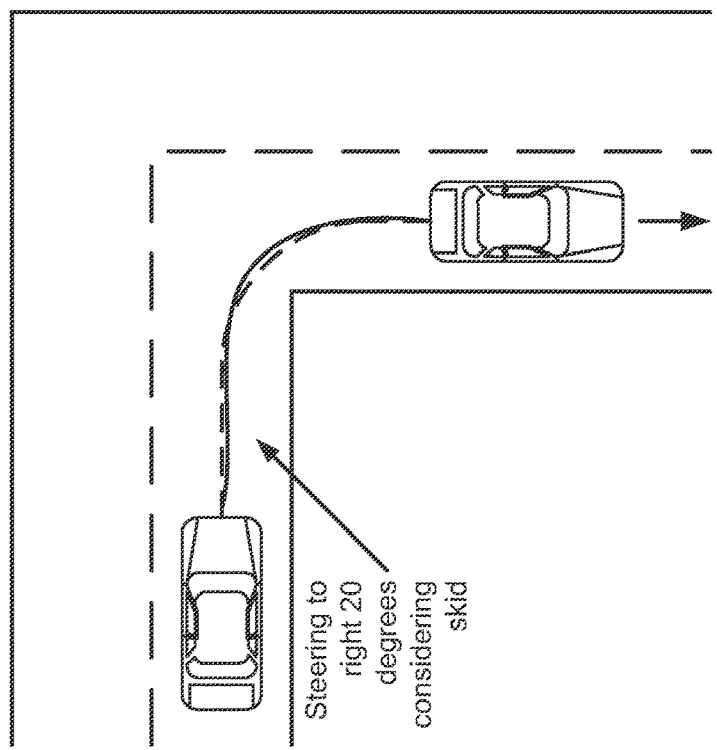
FIGS. 10A and 10B are diagrams illustrating a vehicle driving pattern with or without sideslip compensation.
Figure 10A:
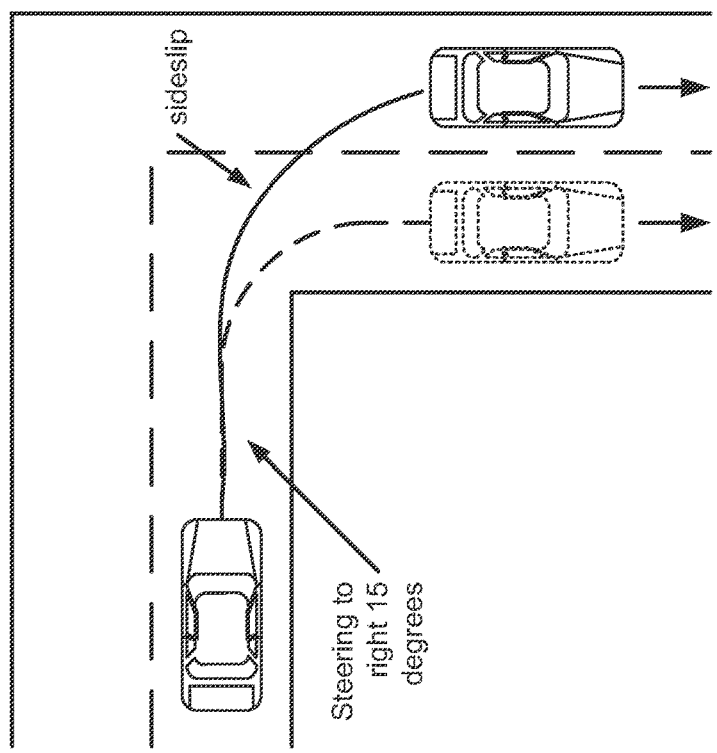

For example, as shown in FIG. 10A, if the current goal is to make a right turn, the steering angle will be calculated as 15 degrees, for example, using a physical model. The vehicle may skid sideways in a high speed. Although the steering angle may be modified from time to time when the system detects that the vehicle is skidded, there was still a large route error due to the sideslip. With the sideslip compensation as described above, it will be better when considering the skid under the circumstances when planning the next movement of the vehicle, in this example, by adjusting the steering angle to 20 degrees as shown in FIG. 10B, such that the vehicle moves close to the path as planned under the circumstances.

Figure 11:
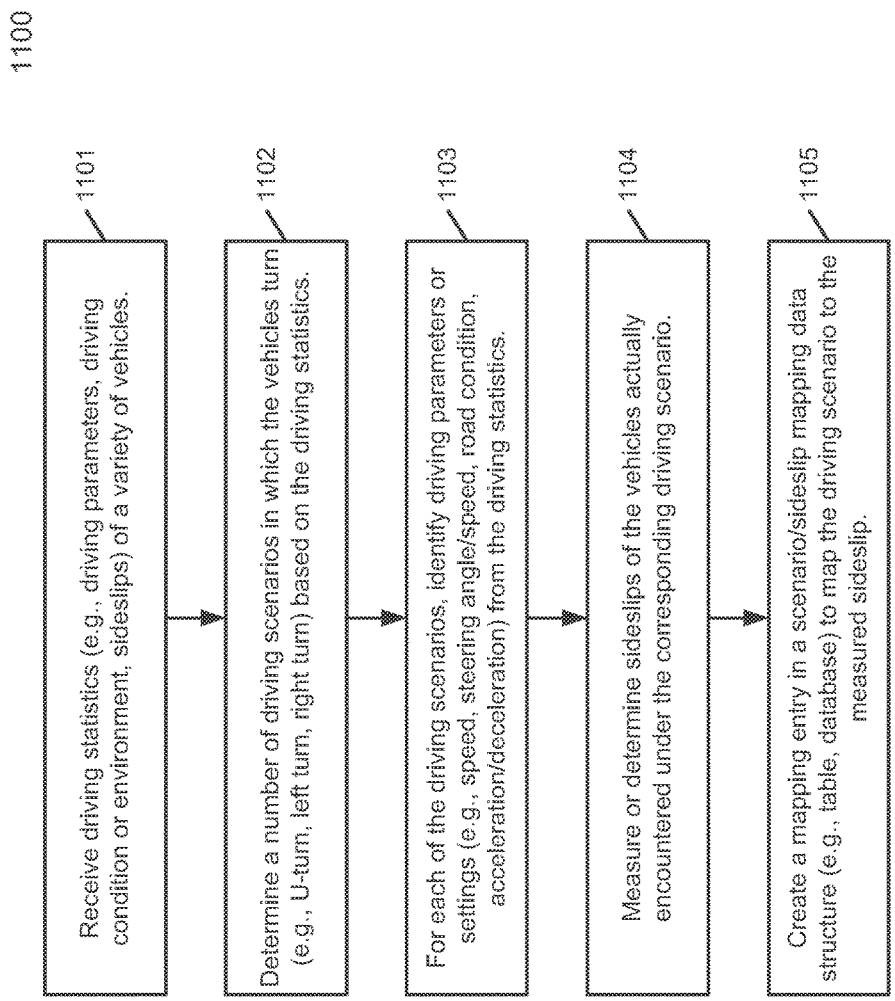
FIG. 11 is a flow diagram illustrating a process of generating a driving scenario to sideslip mapping data structure according to one embodiment of the invention.

FIG. 11 is a flow diagram illustrating a process of generating a driving scenario to sideslip mapping data structure according to one embodiment of the invention. Process 1100 may be performed by processing logic which may include software, hardware, or a combination thereof. Process 1100 may be performed by a data analytics system such as server 103 of FIG. 1. Referring to FIG. 11, at block 1101, processing logic receives driving statistics (e.g., driving parameters, states, settings, and driving conditions) of a variety of vehicles under a variety of driving environments. At block 1102, processing logic determines a number of driving scenarios of making a turn (e.g., U-turn, left turn, or right turn) based on the driving statistics. For each of the determined driving scenarios, at block 1103, processing logic identifies the driving parameters or settings (e.g., speed, steering angle, road condition, weather) from the driving statistics. At block 1104, processing logic measures and determines the sideslip from the driving statistics. At block 1105, a scenario/sideslip mapping table is created. The scenario/sideslip mapping table includes a number of mapping entries, each mapping entry mapping a driving scenario to a sideslip or turning radius. The scenario/sideslip mapping table may be utilized subsequently for sideslip compensation during onboard driving.

Figure 12:
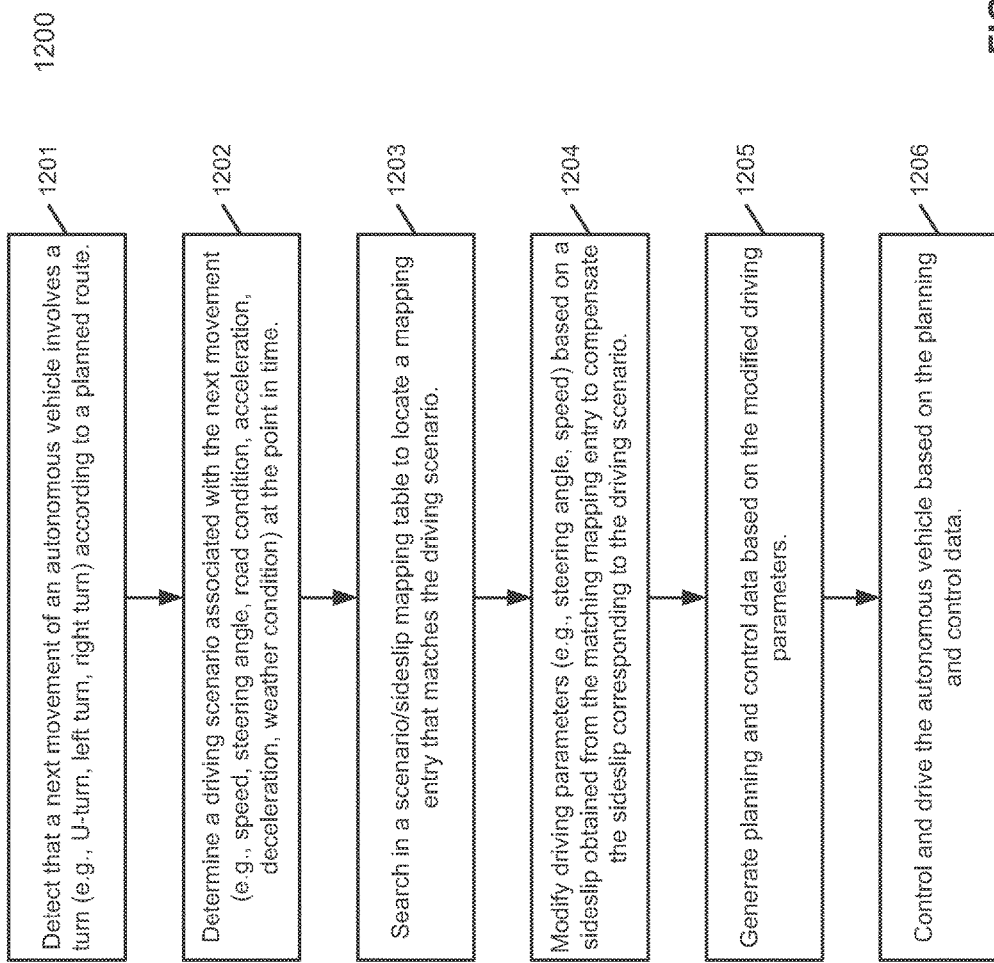
FIG. 12 is a flow diagram illustrating a process of operating an autonomous vehicle according to another embodiment of the invention

FIG. 12 is a flow diagram illustrating a process of operating an autonomous vehicle according to one embodiment of the invention. Process 1200 may be performed by processing logic which may include software, hardware, or a combination thereof. Process 1200 may be performed by data processing system 110. Referring to FIG. 12, at block 1201, processing logic detects that a next movement of an autonomous vehicle involves turning (e.g., U-turn, left turn, or right turn) according to route data as planned. At block 1202, processing logic determines a driving scenario for the next movement (e.g., speed, acceleration/deceleration, steering angle, road condition, and weather condition) based on the planned route data. At block 1203, processing logic performs a lookup operation in a scenario/sideslip mapping table based on the determined driving scenario to locate a mapping entry matching the determined driving scenario. Sideslip corresponding to the driving scenario is obtained from the matching entry. At block 1204, processing logic modifies at least some driving parameters as planned (e.g., steering angle, speed, or timing of issuing commands) to compensate the sideslip. At block 1205, processing logic generates planning and control data based on the modified driving parameters. At block 1206, the autonomous vehicle is controlled and driven based on the planning and control data.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 13:
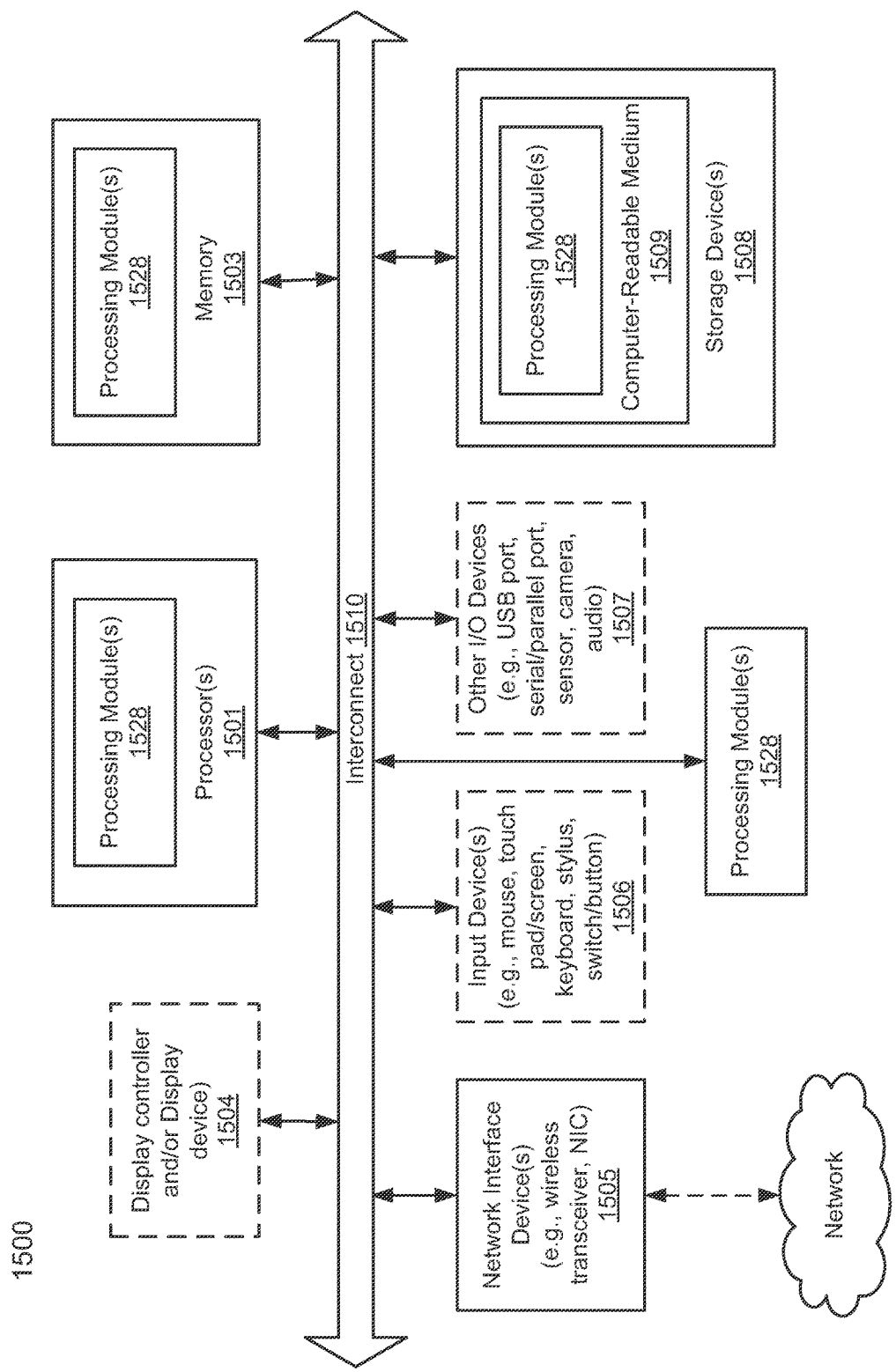
FIG. 13 is a block diagram illustrating a data processing system according to one embodiment.

FIG. 13 is a block diagram illustrating an example of a data processing system which may be used with one embodiment of the invention. For example, system 1500 may represent any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, machine-learning engine 160, data collector 151, analysis module 152, sideslip determination module 306, etc. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
    defining a plurality of driving scenarios for a plurality of types of autonomous vehicles, each driving scenario corresponding to a specific movement of a particular type of autonomous vehicles;
    for each of the driving scenarios of each type of autonomous vehicles, obtaining driving statistics of each autonomous vehicle, including
        recording one or more driving parameters used to control and drive each autonomous vehicle of the type,
        capturing a driving condition corresponding the driving scenario, and
        calculating an average sideslip caused by the driving parameters and the driving condition based on sideslips of a number of autonomous vehicles of the type under identical driving conditions; and
    storing a driving scenario to a sideslip (scenario/sideslip) mapping table having a plurality of mapping entries to map the driving scenario to the calculated average sideslip, wherein the scenario/sideslip mapping table is utilized to compensate a sideslip under a similar driving scenario, the method further including
        determining a driving scenario based on a driving condition of an autonomous vehicle;
        identifying an entry matching the driving scenario from the scenario/sideslip mapping table;
        obtaining an average sideslip from the matching entry; and
        adjusting a steering angle of the autonomous vehicle using the obtained average sideslip.

2. The method of claim 1, further comprising:
in response to determining a next movement of the autonomous vehicle, determining a first driving scenario corresponding to the next movement;
searching in the scenario/sideslip mapping table based on the first driving scenario to locate a mapping entry corresponding to a second driving scenario matching the first driving scenario; and
determining the next movement for the autonomous vehicle by taking into consideration of a first sideslip obtained from the located mapping entry.

3. The method of claim 2, wherein determining the next movement for the autonomous vehicle by taking into consideration of a first sideslip obtained from the located mapping entry comprises:
calculating a first steering angle based on a speed required by a route associated with the next movement using a predetermined algorithm;
modifying the first steering angle in view of the first sideslip obtained from the located mapping entry, generating a second steering angle; and
controlling the autonomous vehicle based on the second steering angle.

4. The method of claim 1, wherein the driving condition comprises at least one of a type of road or a weather condition.

5. The method of claim 1, wherein a driving parameter identifies an action an autonomous vehicle is taking, a speed during the action, or a steering angle during the action.

6. The method of claim 5, wherein the driving parameter further identifies a type of an autonomous vehicle involved.

7. The method of claim 5, wherein the action is one of a left turn, a right turn, or a U-turn.

8. A non-transitory machine-readable medium having instructions stored therein, which when executed by a processor, cause the processor to perform operations of operating an autonomous vehicle, the operations comprising:
defining a plurality of driving scenarios for a plurality of types of autonomous vehicles, each driving scenario corresponding to a specific movement of a particular type of autonomous vehicles;
for each of the driving scenarios of each type of autonomous vehicles, obtaining driving statistics of each autonomous vehicle, including
recording one or more driving parameters used to control and drive each autonomous vehicle of the type,
capturing a driving condition corresponding the driving scenario, and
calculating an average, sideslip caused by the driving parameters and the driving condition based on sideslips of a number of autonomous vehicles of the type under identical driving conditions; and
storing a driving scenario to a sideslip (scenario/sideslip) mapping table having a plurality of mapping entries to map the driving scenario to the calculated average sideslip, wherein the scenario/sideslip mapping table is utilized to compensate a sideslip under a similar driving scenario, the operations further including
determining a driving scenario based on a driving condition of an autonomous vehicle;
identifying an entry matching the driving scenario from the scenario/sideslip mapping table;
obtaining an average sideslip from the matching entry; and
adjusting a steering angle of the autonomous vehicle using the obtained average sideslip.

9. The machine-readable medium of claim 8, wherein the operations further comprise:
in response to determining a next movement of the autonomous vehicle, determining a first driving scenario corresponding to the next movement;
searching in the scenario/sideslip mapping table based on the first driving scenario to locate a mapping entry corresponding to a second driving scenario matching the first driving scenario; and
determining the next movement for the autonomous vehicle by taking into consideration of a first sideslip obtained from the located mapping entry.

10. The machine-readable medium of claim 9, wherein determining the next movement for the autonomous vehicle by taking into consideration of a first sideslip obtained from the located mapping entry comprises:
calculating a first steering angle based on a speed required by a route associated with the next movement using a predetermined algorithm;
modifying the first steering angle in view of the first sideslip obtained from the located mapping entry, generating a second steering angle; and
controlling the autonomous vehicle based on the second steering angle.

11. The machine-readable medium of claim 8, wherein the driving condition comprises at least one of a type of road or a weather condition.

12. The machine-readable medium of claim 8, wherein a driving parameter identifies an action an autonomous vehicle is taking, a speed during the action, or a steering angle during the action.

13. The machine-readable medium of claim 12, wherein the driving parameter further identifies a type of an autonomous vehicle involved.

14. The machine-readable medium of claim 12, wherein the action is one of a left turn, a right turn, or a U-turn.

15. A data processing system, comprising:
a processor; and
a memory coupled to the processor to store instructions, which when executed by the processor, cause the processor to perform operations of operating an autonomous vehicle, the operations including
defining a plurality of driving scenarios for a plurality of types of autonomous vehicles, each driving scenario corresponding to a specific movement of a particular type of autonomous vehicles,
for each of the driving scenarios of each type of autonomous vehicles, obtaining driving statistics of each autonomous vehicle, including
recording one or more driving parameters used to control and drive each autonomous vehicle of the type,
capturing a driving condition corresponding the driving scenario, and
calculating an average sideslip caused by the driving parameters and the driving condition based on sideslips of a number of autonomous vehicles of the type under identical driving conditions, and
storing a driving scenario to a sideslip (scenario/sideslip) mapping table having a plurality of mapping entries to map the driving scenario to the calculated average sideslip, wherein the scenario/sideslip mapping table is utilized to compensate a sideslip under a similar driving scenario, the operations further including
determining a driving scenario based on a driving condition of an autonomous vehicle;

identifying an entry matching the driving scenario from the scenario/sideslip mapping table;

obtaining an average sideslip from the matching entry; and adjusting a steering angle of the autonomous vehicle using the obtained average sideslip.

16. The system of claim 15, wherein the operations further comprise:

in response to determining a next movement of the autonomous vehicle, determining a first driving scenario corresponding to the next movement;

searching in the scenario/sideslip mapping table based on the first driving scenario to locate a mapping entry corresponding to a second driving scenario matching the first driving scenario; and determining the next movement for the autonomous vehicle by taking into consideration of a first sideslip obtained from the located mapping entry.

17. The system of claim 16, wherein determining the next movement for the autonomous vehicle by taking into consideration of a first sideslip obtained from the located mapping entry comprises:

calculating a first steering angle based on a speed required by a route associated with the next movement using a predetermined algorithm;

modifying the first steering angle in view of the first sideslip obtained from the located mapping entry, generating a second steering angle; and controlling the autonomous vehicle based on the second steering angle.

18. The system of claim 15, wherein the driving condition comprises at least one of a type of road or a weather condition.

19. The system of claim 15, wherein a driving parameter identifies an action an autonomous vehicle is taking, a speed during the action, or a steering angle during the action.

20. The system of claim 19, wherein the driving parameter further identifies a type of an autonomous vehicle involved.

21. The system of claim 19, wherein the action is one of a left turn, a right turn, or a U-turn.

* * * * *